United States Patent
Krishnan et al.

(10) Patent No.: US 10,754,698 B2
(45) Date of Patent: *Aug. 25, 2020

(54) NETWORK-AWARE WORKLOAD PLACEMENT IN A DATA CENTER

(71) Applicant: Cisco Technology, Inc., San Jose, CA (US)

(72) Inventors: Padmanabhan Krishnan, Sunnyvale, CA (US); Rajesh Babu Nataraja, Sunnyvale, CA (US); Shyam Kapadia, San Jose, CA (US); Nader Lahouti, San Jose, CA (US); Viral Rajeshbhai Barot, Sunnyvale, CA (US); Jay Ajaykumar Gheewala, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,030

(22) Filed: Sep. 14, 2018

(65) Prior Publication Data

US 2019/0012202 A1    Jan. 10, 2019

Related U.S. Application Data

(63) Continuation of application No. 14/836,004, filed on Aug. 26, 2015, now Pat. No. 10,078,534.

(Continued)

(51) Int. Cl.
*G06F 9/50* (2006.01)
*H04L 29/08* (2006.01)
*H04L 29/06* (2006.01)

(52) U.S. Cl.
CPC .......... *G06F 9/505* (2013.01); *H04L 67/1008* (2013.01); *H04L 67/1012* (2013.01); *H04L 67/38* (2013.01); *G06F 2209/501* (2013.01)

(58) Field of Classification Search
CPC ..................................................... G06F 9/505
See application file for complete search history.

(56) References Cited

U.S. PATENT DOCUMENTS

2002/0091825 A1   7/2002   Shuster
2008/0080517 A1   4/2008   Roy et al.
(Continued)

OTHER PUBLICATIONS

AWS, Amazon EC2 API Tools, 2014, Amazon Web Services Created Aug. 23, 2006, Last Updated Jul. 3, 2015, 2 pages.

*Primary Examiner* — Charlie Sun
(74) *Attorney, Agent, or Firm* — Patterson + Sheridan, LLP

(57) ABSTRACT

Techniques for virtual workload deployment based on computing resource hardware load and associated network hardware load. For each of a plurality of computing resources within one or more data centers onto which a virtual workload can be deployed, a computing resource hardware load of the respective computing resource is determined. Network topology information is maintained for at least one network fabric of the one or more data centers, and an associated network hardware load of a network device communicatively connected to the respective computing resource is determined. Embodiments automatically select one or more computing resources. The virtual workload is deployed onto the automatically selected one or more computing resources.

19 Claims, 5 Drawing Sheets

Related U.S. Application Data

(60) Provisional application No. 62/107,200, filed on Jan. 23, 2015.

(56) References Cited

U.S. PATENT DOCUMENTS

| | | |
|---|---|---|
| 2008/0201414 A1 | 8/2008 | Amir Husain et al. |
| 2009/0254914 A1* | 10/2009 | Sundaresan ............ G06F 9/505 718/103 |
| 2010/0254703 A1 | 10/2010 | Kirkpatrick et al. |
| 2013/0066951 A1 | 3/2013 | Agranat et al. |
| 2014/0068075 A1* | 3/2014 | Bonilla ............... H04L 41/0823 709/226 |
| 2014/0237114 A1 | 8/2014 | Lin |
| 2015/0074262 A1 | 3/2015 | Antony |
| 2015/0092561 A1 | 4/2015 | Sigoure |
| 2015/0296002 A1* | 10/2015 | Pell ........................ G06F 9/505 709/226 |
| 2015/0381487 A1 | 12/2015 | Broz et al. |
| 2016/0217010 A1 | 7/2016 | Krishnan et al. |

* cited by examiner

NETWORK-AWARE WORKLOAD PLACEMENT IN A DATA CENTER

CROSS-REFERENCE TO RELATED APPLICATIONS

This application is a continuation of co-pending U.S. patent application Ser. No. 14/836,004, filed Aug. 26, 2015, which claims benefit of U.S. provisional patent application Ser. No. 62/107,200, filed Jan. 23, 2015. The aforementioned related patent application is herein incorporated by reference in its entirety.

TECHNICAL FIELD

Embodiments presented in this disclosure generally relate to providing access to computing resources, and more particularly, to identifying an optimal location for placement of virtual workloads.

BACKGROUND

Cloud computing has become a popular approach for obtaining access to (sometimes large-scale) computing resources. Cloud computing allows users to build virtualized data centers which include compute, networking, application, and storage resources without having to build or maintain a physical computing infrastructure. The virtualized data center may provide a user with a segmented virtual network located in the cloud, typically alongside virtualized data centers of other users. Such a virtualized data center may be rapidly scaled up (or down) according to the computing needs of a given user without the need to maintain excess computing capacity between peak demand periods. For example, an online retailer can scale a virtualized data center to meet increased demand during the holiday shopping season without having to maintain the underlying physical computing infrastructure used to provide the retailer's online presence.

Often times, a cloud-computing environment is created using multiple data centers, with each data center providing various computing resources to the cloud. Such data centers are frequently located in different geographical locations. Furthermore, the resources that each data center provides to the cloud may differ. As such, a technical challenge exists in deploying workloads to optimal computing resources within cloud computing environments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
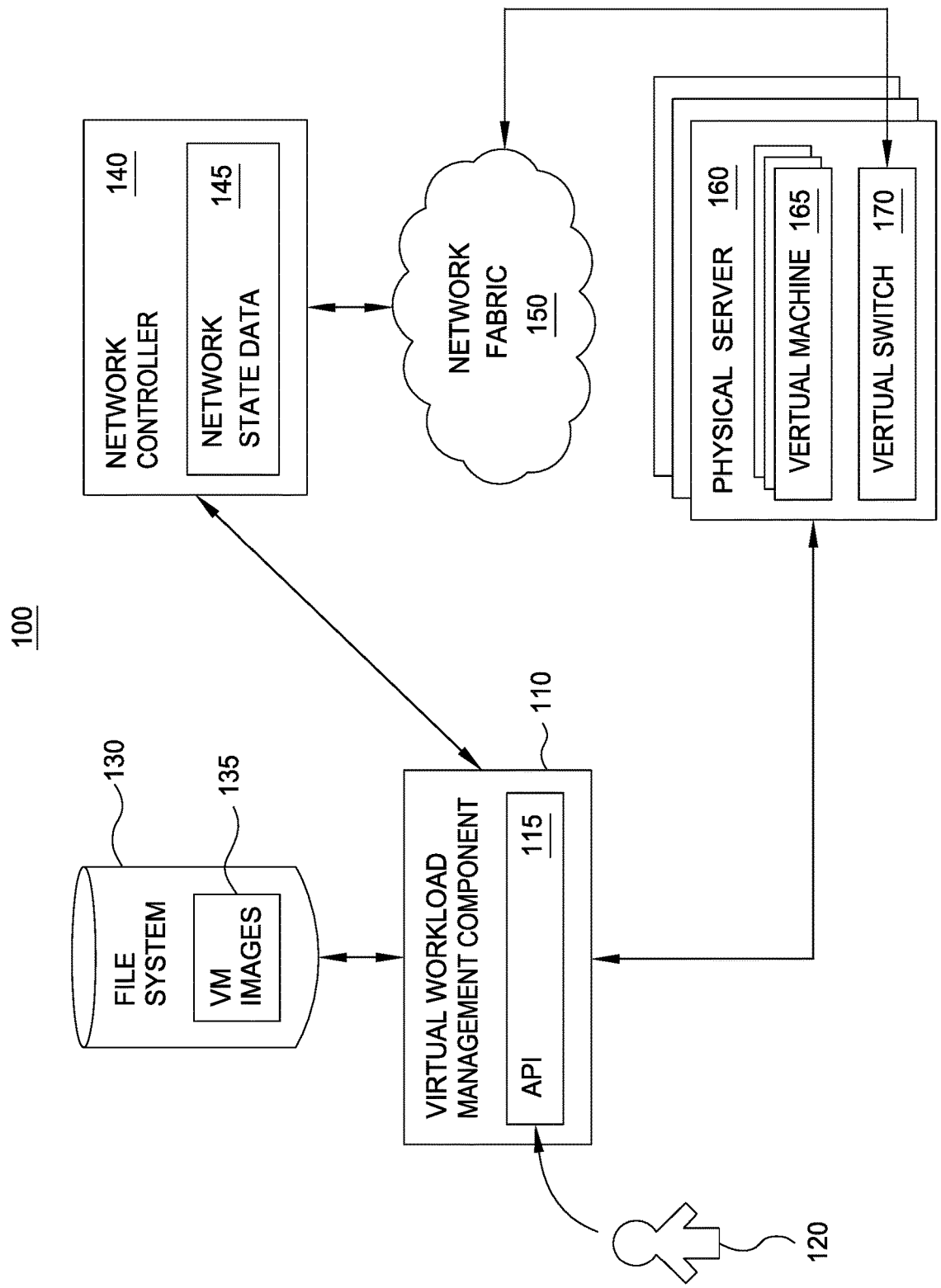
FIG. 1 is a block diagram illustrating a data center configured with a virtual workload management component, according to one embodiment described herein.

Embodiments presented in this disclosure provide a method, system and computer-readable medium for virtual workload deployment based on computing resource hardware load and associated network hardware load. The method, system and computer-readable medium include, for each of a plurality of computing resources within one or more data centers onto which a virtual workload can be deployed, determining a computing resource hardware load of the respective computing resource, maintaining network topology information for at least one network fabric of the one or more data centers, and determining, based on network state data for the network fabric, an associated network hardware load of a network device communicatively connected to the respective computing resource. In response to the determining and the maintaining, the method, system and computer-readable medium can automatically select one or more computing resources of the plurality of computing resources based on evaluating, for each of the plurality of computing resources and by operation of one or more computer processors, a predefined function of both (i) the computing resource hardware load of the respective computing resource and (ii) the associated network hardware load of the network device communicatively connected to the respective computing resource. The method, system and computer-readable medium include deploying the virtual workload onto the automatically selected one or more computing resources, whereafter an indication that the virtual workload is deployed is outputted.

Example Embodiments

Cloud computing has become a popular approach for obtaining access to (sometimes large-scale) computing resources. Cloud computing allows users to build virtualized data centers which include compute, networking, application, and storage resources without having to build or maintain a physical computing infrastructure. The virtualized data center may provide a user with a segmented virtual network located in the cloud, typically alongside virtualized data centers of other users. Such a virtualized data center may be rapidly scaled up (or down) according to the computing needs of a given user without the need to maintain excess computing capacity between peak demand periods. For example, an online retailer can scale a virtualized data center to meet increased demand during the holiday shopping season without having to maintain the underlying physical computing infrastructure used to provide the retailer's online presence.

Often times, a cloud-computing environment is created using multiple data centers, with each data center providing various computing resources to the cloud. Such data centers are frequently located in different geographical locations. Furthermore, the resources that each data center provides to the cloud may differ. For example, a first data center may provide higher performance computing resources than a second data center, or may provide fast network access to particular computing resources that are not provided at all by the second data center. Additionally, the workloads of the computing resources provided by each of the data centers may differ as well. For instance, while the computing resources of the first data center may be operating at 90% capacity, the computing resources of the second data center may only be operating at 20% capacity.

When deploying virtual workloads within a data center, conventional systems may include logic to select a physical server that is suitable for the deployment of the virtual workload. For example, conventional systems may consider a physical server's computing resources and computing resource usage. However, current techniques are unable to account for the state of other resources.

The popularity of server virtualization, from virtual machines to containers to storage, has resulted in a rapid rise in cloud-based data centers. In a data center, virtual machines and other virtual workloads are deployed by the compute and storage orchestrators based on various heuristics. Typically, these heuristics include server resources such as vCPU, memory, etc. Other heuristics include deploying a virtual machine based on application affinity, selection of compute node closer to a storage bank, etc. The eventual goal is to deploy applications made up of virtual machines interconnected in different tiers with appropriate security policies determining the interaction between the tiers. The physical servers on which the virtual workloads can be deployed are typically arranged in racks each equipped with a pair of Top-of-Rack (ToR) switch. The ToRs themselves may be interconnected by a layer of spine switches realizing a CLOS topology.

However, such compute and storage are typically "blind" to the network state of network resources used by the physical servers. For example, it is possible that the ToR to which the virtualized physical server where the virtual machine is deployed, is oversubscribed in terms of its hardware or software resources. Such resources may include MAC Table Entries, VLAN availability, hardware routes availability, bandwidth subscription, certain feature availability in the switch, server uplink or fabric link subscription, etc. Clearly, deploying a virtual machine below a ToR that is not going to be able to satisfy its network requirements is not ideal.

As such, embodiments provide a virtual workload management component that considers heuristics about the state or health of the network when deploying virtual workloads onto virtualized physical servers. Generally, the virtual workload management component is configured to take into account application containers with services as a whole when deploying a virtual workload or a portion of a virtual workload, and not merely individual virtual machine (VM) placement. Moreover, as the network state changes over a period of time, the virtual workload management component can perform a live migration of the workloads to better utilize the network resources and to ensure the optimal performance of the deployed virtual workloads.

Generally, embodiments described herein may pertain to clouds of computing resources which are hosted using a plurality of multi-tenant data centers. As defined herein, the term "computing resources" generally refers to any computer-related resources, examples of which include, without limitation, processing resources, storage resources, network resources and software resources. A "data center" may be any location which hosts cloud services and which provides computing resources to the cloud. More generally, however, a data center may be any environment in which virtual workloads are deployed onto physical servers. Embodiments described herein provide a method for identifying an optimal physical server(s) within a data center (e.g., of a cloud computing environment) for the provisioning of a virtualized workload (e.g., for an end user). Such a virtual workload may include one or more virtual machines, as well as additional services such as load balancing, firewall, multi-VLANs (sub-container's), and MPLS VPN services, delivered to users as a complete end-to-end service.

Embodiments described herein may be provided to end users through a cloud-computing infrastructure. Cloud computing generally refers to the provision of segmented hardware and software resources as a service delivered over a network. More formally, cloud computing may provide an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space consumed by a user or a number of virtualized systems instantiated by the user). A user can typically access any of the resources that reside in the cloud at any time, and from anywhere across the Internet. In context of the present disclosure, users may submit a request to a cloud service for a virtual workload to be deployed. As described in greater detail below, a workload management system may select a physical server(s) within a data center on which to deploy the virtual workload, based on a network state of network resources relating to the physical server(s) and located within a switch fabric. The workload management system may then transmit the received virtual workload to the physical server(s) for deployment.

FIG. 1 is a block diagram illustrating a data center configured with a virtual workload management component, according to one embodiment described herein. As shown, the system 100 includes a virtual workload management component 110, a file system 130 storing virtual machine (VM) instances 135, a user 120, a network controller 140, a network switch fabric 150 and physical computing servers 160. The virtual workload management component 110 includes an application programming interface (API) which the user can access to deploy virtual machine instances from VM images 135 onto the physical resources of one of the physical servers 160. Of note, while examples are discussed herein where VM images 135 are deployed onto the physical servers 160, such examples are provided for illustrative purposes only and without limitation, and more generally any virtual workload (e.g., a container such as a Linux® container, jobs in a distributed computing environment, etc.) can be intelligently deployed using the techniques described herein.

The network controller 140 generally maintains network state data 145 describing a state of network resources within the network switch fabric 150. In the depicted embodiment, each of the physical servers 160 includes a plurality of virtual machines 165 and a virtual switch 170. Generally, the virtual switch 170 facilitates the network communication of the virtual machines 165 on the switch fabric network 150. Of course, such a depiction is provided for illustrative purposes only and without limitation. Moreover, one of ordinary skill in the art will understand that such an environment may also include physical servers with fewer or no virtual machines deployed (e.g., a server that includes only a single virtual machine, a bare metal server in which the virtual machine is installed directly onto the hardware of the physical server rather than within an operating system of the physical server, etc.).

Generally, the virtual workload management component 110 can receive requests to deploy a VM image 135 as a virtual machine on a physical server 160 (e.g., based on a request submitted by user 120 using API 115). In one embodiment, the virtual workload management component 110 includes an OpenStack® Orchestration program. As a general matter, while a particular physical server 160 may have available computing resources that satisfy the requirements of a VM image 135 being deployed, there may be issues within the network fabric 150 that affect the particular physical server 160 and make the particular physical server 160 ill-suited for the deployment of the VM image 135. For example, if one or more links assigned to the particular physical server 160 within the switch fabric are experiencing problems, a VM image 135 deployed to the particular physical server 160 may experience problems relating to network connectivity. As another example, if the link directly connecting the particular physical server 160 to a Top-of-Rack (ToR) switch within the network fabric is experiencing problems, this too could affect the network connectivity of applications and virtual workloads deployed onto the particular physical server 160.

As such, upon receiving such a request, the virtual workload management component 110 can access the network state data 145 using an API of the network controller 140 for use in selecting an optimal or suitable physical server 160 onto which to deploy the VM image 135. In one embodiment, the network controller 140 represents the Cisco® Prime Data Center Network Manager application. Additionally, the virtual workload management component 110 can maintain network topology information for the network fabric 150 for use in determining which physical servers 160 are affected by a particular network resource within the network fabric 150. For example, if retrieved the network state data 145 indicates that a link between a particular ToR switch and a spine network switch within the network fabric 150 has gone down or is otherwise experiencing problems, the virtual workload management component 110 could use the topology information for the network fabric 150 to determine which physical servers 160 are connected to the particular ToR switch and thus may be affected by the downed link.

The virtual workload management component 110 could then select a physical server 160 that is determined to be suitable for the deployment of the VM image 135, based at least in part on the retrieved network state data 145 and topology information for the network fabric 150. In doing so, the virtual workload management component 110 may further consider the physical computing resources off the physical servers 160 as well as the current workload of the physical servers 160. By considering network fabric state data in determining a suitable physical server 160 for deploying a virtual workload, embodiments provide a more intelligent workload deployment system.

In addition to intelligently selecting a physical server on which to deploy new virtual workloads (e.g., virtual machine images, containers such as Linux® containers, etc.), the virtual workload management component 110 can be configured to actively monitor existing virtual workload deployments and to intelligently move a workload from one physical server 160 to another, based at least in part on the network state data 145 and network topology information for the network fabric 150. For example, if the virtual workload management component 110 determines that a particular ToR switch within the network fabric 150 is experiencing a heavy workload that may impact the performance of deployed virtual workloads using the particular ToR switch, the virtual workload management component 110 may redeploy one of the deployed virtual workloads to a different physical server 160 connected to a different ToR switch in order to reduce the workload of the particular ToR switch. Doing so provides a more efficient utilization of the available network resources within the network fabric 150 and further ensures the optimal performance of the deployed virtual workloads.

Figure 2:
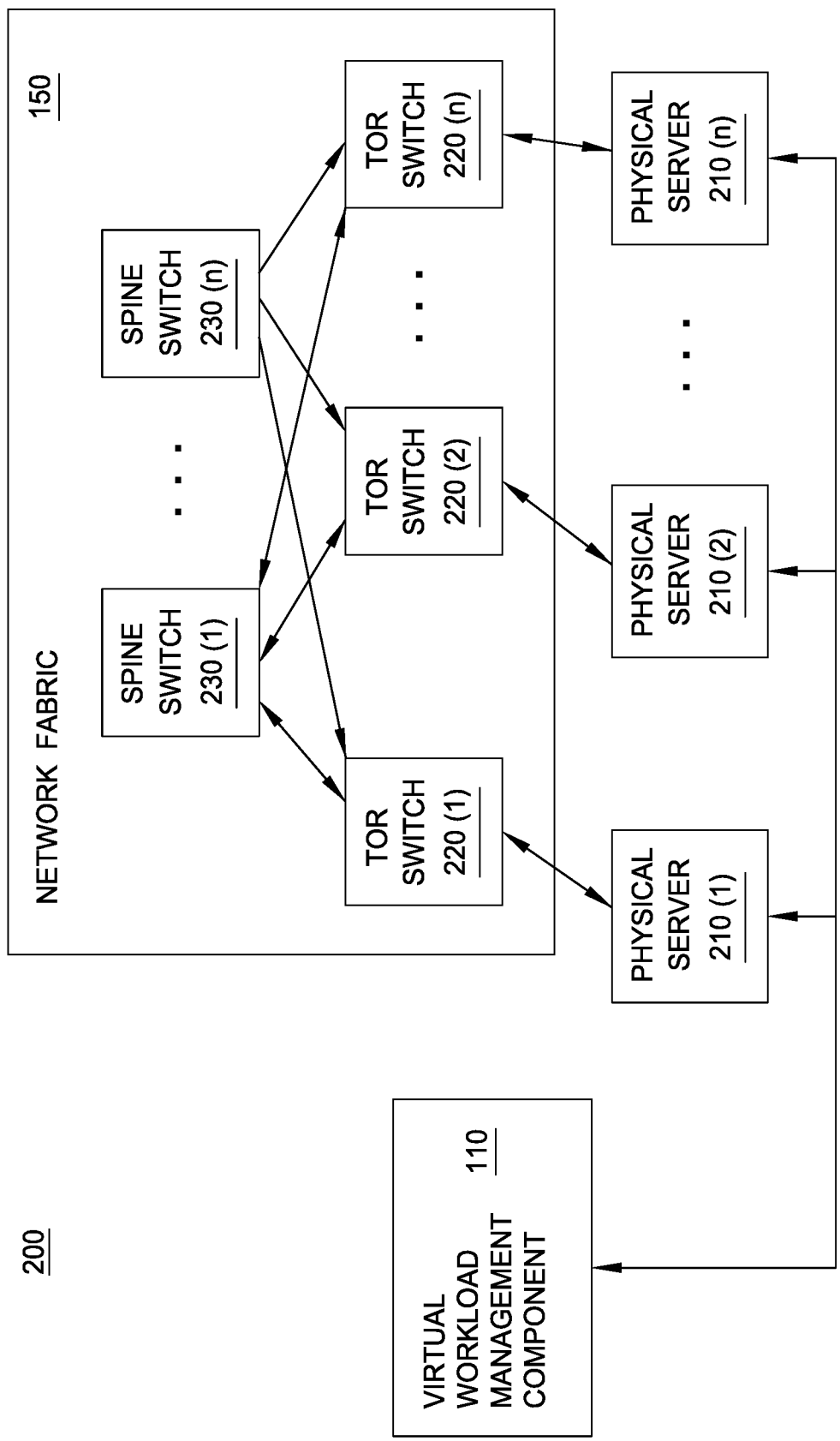
FIG. 2 is a block diagram illustrating a network fabric environment configured with a virtual workload management component, according to one embodiment described herein.

FIG. 2 is a block diagram illustrating a network fabric environment configured with a virtual workload management component, according to one embodiment described herein. As shown, the network fabric environment 200 includes the virtual workload management component 110, a plurality of physical servers 210(1)-(N) and the network fabric 150. The network fabric includes a plurality of spine switches 230(1)-(N) and a plurality of ToR switches 220(1)-(N). In the depicted embodiment, the plurality of spine switches 230(1)-(N) and the plurality of ToR switches 220(1)-(N) form a network topology such that each of the plurality of spine switches 230(1)-(N) is connected to all of ToR switches 220(1)-(N). More generally, however, any network topology can be used to connect the various network devices within the network fabric 150.

Generally, each of the ToR switches 220(1)-(N) manages network communications for a respective rack of computing devices (e.g., servers, blade systems, etc.) and facilitates network communications between network devices within the network fabric 150 and the computing devices in the respective rack. A ToR architecture may be preferable, as, for example, such architectures facilitate the rapid deployment of an entire rack of computing devices within a data center environment. That is, in a ToR architecture, an entire rack may be deployed within the data center at a time, oftentimes reducing deployment times to hours instead of days.

As discussed above, the virtual workload management component 110 can access network state data (e.g., using an API of the network controller 140) describing a state of various network resources within the network fabric 150 and the virtual workload management component 110 can consider such network state information in selecting an optimal physical server 210(1)-N) to deploy a virtual workload (e.g., a VM image). Additionally, the virtual workload management component 110 can maintain network topology information for the network fabric 150 and can use such a topology to determine, for each of the physical servers 210(1)-(N), which network devices within the network fabric 150 affect the respective physical server. As an example, the virtual workload management component 110 could determine that physical server 210(1) is affected by ToR switch 220(1), as well as the various links between ToR switch 220(1) and the spine switches 230(1)-(N).

The virtual workload management component 110 could then determine a respective suitability value for each of the physical servers 210(1)-(N), describing a respective fitness of each of the physical servers 210(1)-(N) for hosting the virtual workload. Generally, the virtual workload management component 110 can take any performance-related metric or information into account when determining the suitability value. For example, if the network state data indicates that a link between ToR switch 220(1) and spine network switch 230(1) within the network fabric 150 has gone down or is otherwise experiencing problems, the virtual workload management component 110 could determine a relatively lower suitability value for the physical server 210(1), as the ToR switch 220(1) is connected to the spine network switch 230(1) and thus may be affected by the downed (or otherwise problematic) link.

Generally, the virtual workload management component 110 could use various different algorithms to determine the suitability value for each of the physical servers 210(1)-(N). For example, the virtual workload management component 110 could evaluate a number of different performance metrics (e.g., latency, workload, rate of loss, etc.) for network devices and links capable of affecting a particular physical server. That is, a network device (or link) could be considered to affect a particular physical server when the network device (or link) is used in routing network data from the physical server through the network fabric 150. The virtual workload management component 110 could then calculate the suitability value using a weighted average of the various performance metrics. For example, values for the various performance metrics could be normalized and then a weight could be assigned to each normalized metric. Normalization can be done to enable parameters with different values ranges to be compared efficiently. As an example, if m1, m2 and mN represent normalized performance metrics for various performance metrics, then the overall network health NH could be computed as shown in Equation 1:

$$NH = w_1 * m_1 \; w_2 * m_2 \ldots + w_N * m_N \quad \text{Equation 1—Overall Network Health}$$

More generally, however, any algorithm for determining the suitability of a physical server 210(1)-(N) can be used, consistent with the present disclosure.

The virtual workload management component 110 could then select one of the physical servers 210(1)-(N) onto which to deploy the virtual workload (e.g., the VM image 135), based on the determined suitability values. That is, the virtual workload management component 110 could select the physical server that is best suited for deploying the virtual workload, based at least in part on the current state of network resources within the network fabric 150 that are capable of affecting the performance of workloads deployed on the physical servers 210(1)-(N). In doing so, the virtual workload management component 110 may further consider the physical servers' computing resources (e.g., type of CPU, total amount of system memory, etc.) as well as system workload information (e.g., CPU workload, current amount of free system memory, etc.). By considering network fabric state data in determining a suitable physical server 160 for deploying a virtual workload, embodiments provide a more intelligent workload deployment system.

In addition to intelligently selecting a physical server on which to deploy new virtual workloads (e.g., virtual machine images, containers such as Linux® containers, etc.), the virtual workload management component 110 can be configured to actively monitor existing virtual workload deployments and to intelligently move a workload from one physical server 210 to a more suitable one of the physical servers 210(1)-(N). For example, the virtual workload management component 110 could monitor the network state data 145 and network topology information for the network fabric 150. For example, if the virtual workload management component 110 determines that a particular ToR switch within the network fabric 150 is experiencing a heavy workload that may impact the performance of deployed virtual workloads using the particular ToR switch, the virtual workload management component 110 may redeploy one of the deployed virtual workloads to a different physical server 160 connected to a different ToR switch in order to reduce the workload of the particular ToR switch. Doing so provides a more efficient utilization of the available network resources within the network fabric 150 and further ensures the optimal performance of the deployed virtual workloads.

Figure 3:
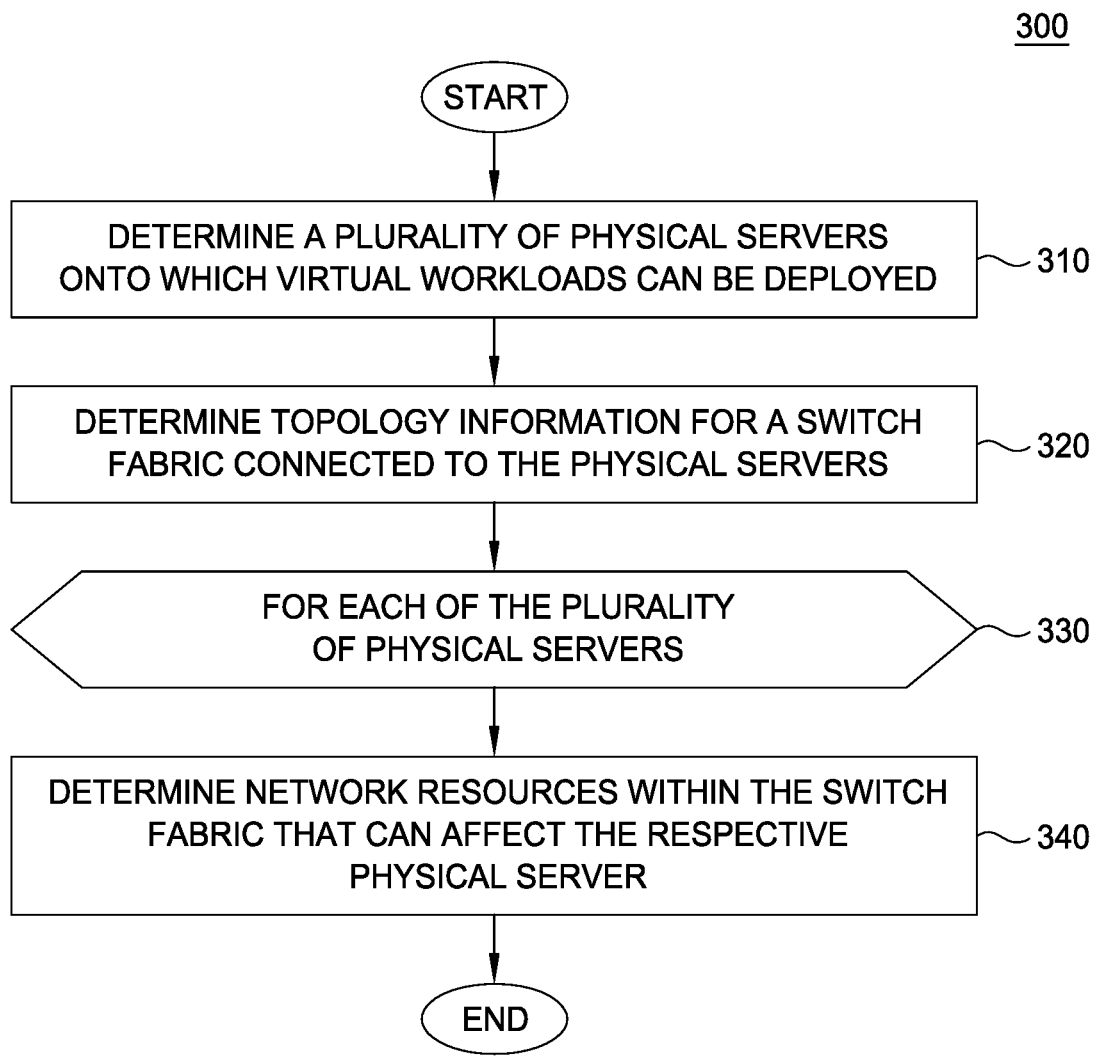
FIG. 3 is a flow diagram illustrating a method for identifying relationships between fabric resources and physical servers, according to one embodiment described herein.

FIG. 3 is a flow diagram illustrating a method for identifying relationships between fabric resources and physical servers, according to one embodiment described herein. As shown, the method 300 begins at block 310, where the virtual workload management component 110 determines a plurality of physical servers onto which virtual workloads can be deployed. For example, the virtual workload management component 110 could identify a number of physical servers (e.g., blade servers) within racks of one or more data centers, where each rack hosts one or more physical servers and wherein each rack is configured with a respective ToR switch.

In the method 300, the virtual workload management component 110 also determines topology information for a switch fabric connected to the physical servers (block 320). Generally, such topology information includes information describing the network devices present within the network switch fabric as well information describing the arrangement and interconnection of the network devices. For each of the plurality of physical servers (block 330), the virtual workload management component 110 then determines network resources within the switch fabric that can affect the respective physical server using the determined topology information (block 340), and the method 300 ends.

The virtual workload management component 110 can then use such topology information to determine which network devices and links between network devices within the network fabric affect a particular physical server. For instance, the virtual workload management component 110 could determine that a particular network device (or link) affects a particular physical server, when network traffic sent from (or to) the physical server can pass through the particular network device (or link). For example, for a particular physical server (e.g., physical server 210(2)), the virtual workload management component 110 could identify the ToR switch adjacent to the physical server (i.e., ToR switch 220(2)) as well as spine network switches to which the identified ToR switch communicates (i.e., spine switches 230(1)-(N)) and various links used to interconnect the physical server, ToR and spine switches (e.g., the links between the ToR switch 220(2) and the various spine switches 230(1)-(N)).

Generally, the virtual workload management component 110 can use such relationship information for interpreting network state data. For example, upon determining that a particular link within the network fabric is experiencing problems, the virtual workload management component 110 may use such relationship information to determine which deployed virtual workloads may be affected by the problematic link. By taking the network state data into account when deploying the virtual workload, embodiments can more accurately select a suitable server for use in deploying the virtual workload.

Figure 4:
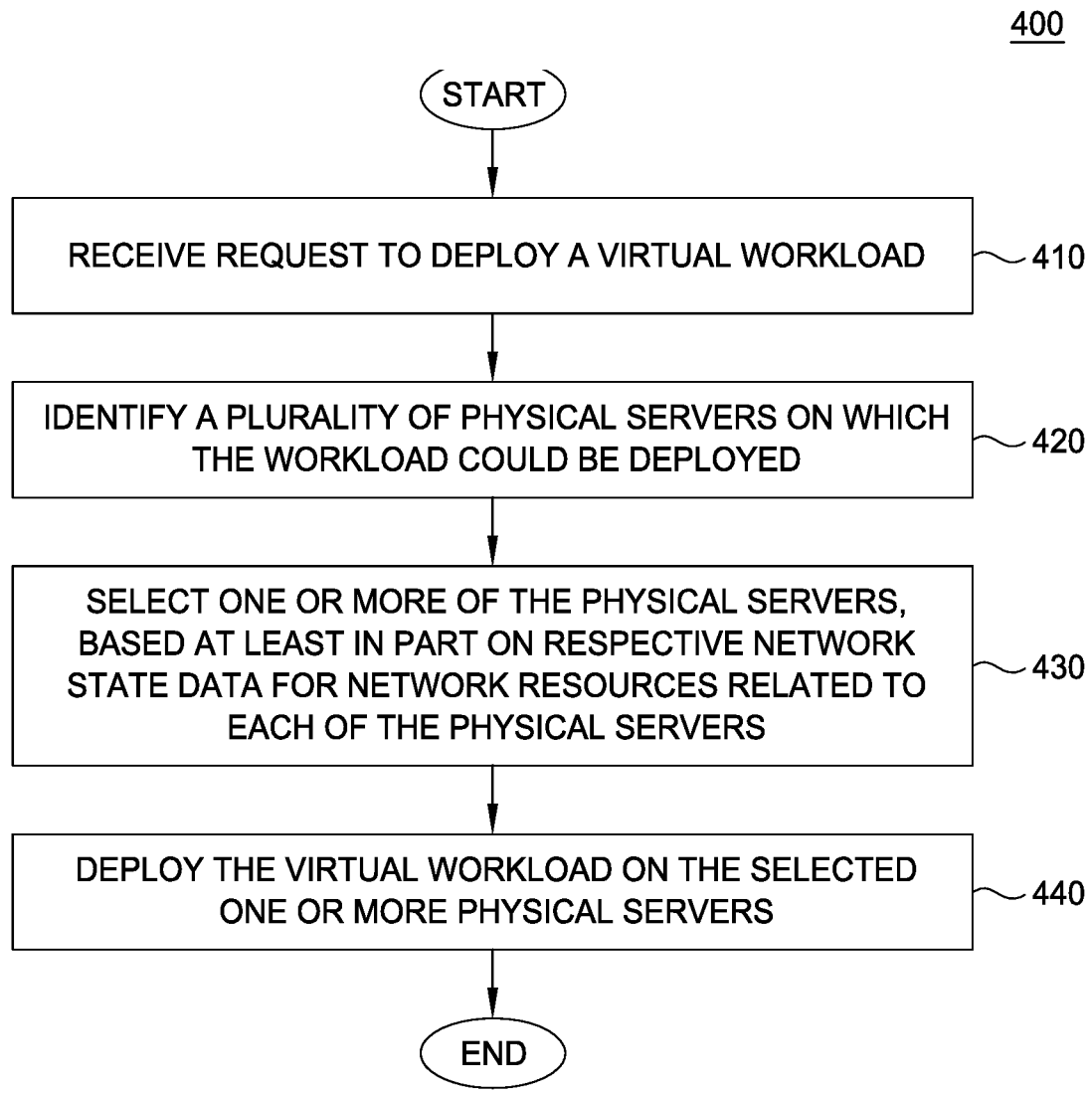
FIG. 4 is a flow diagram illustrating a method for deploying a virtual workload based on network switch fabric state data, according to one embodiment described herein.
Figure 5:
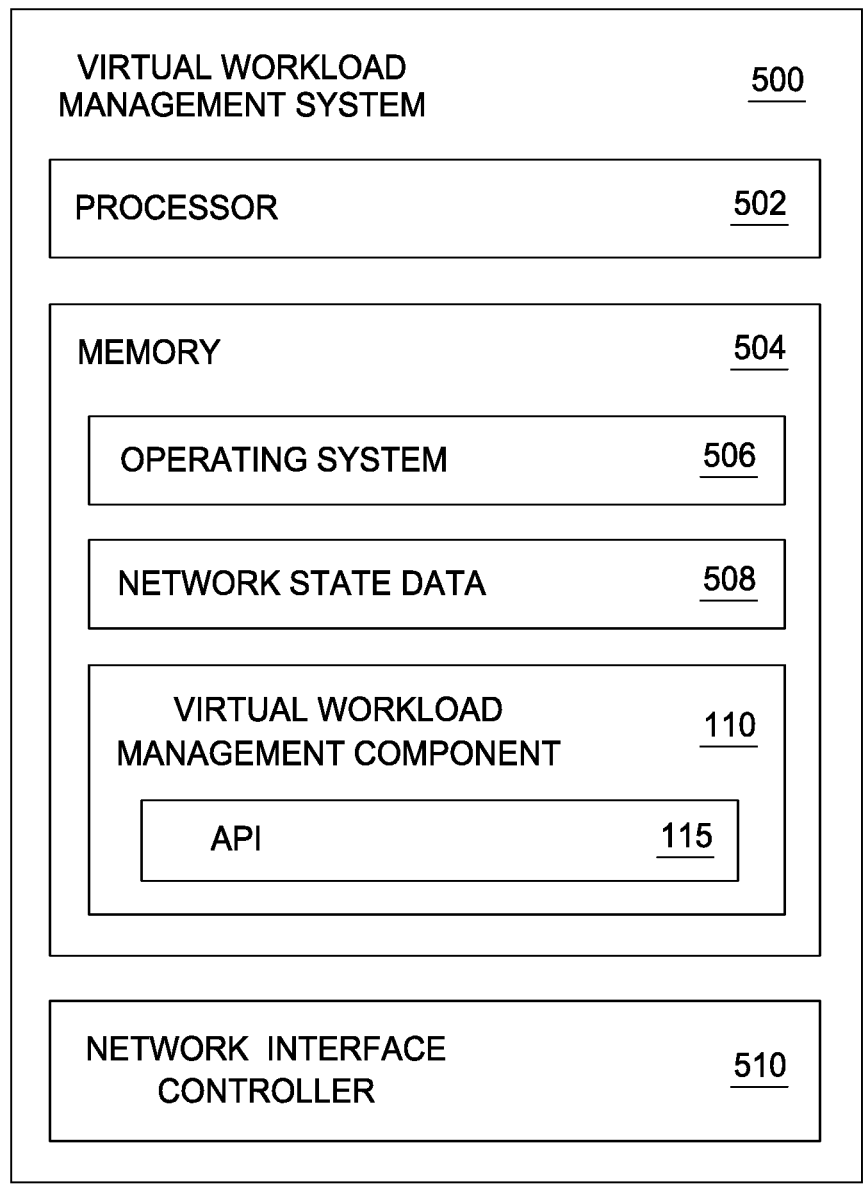
FIG. 5 is a block diagram illustrating a system configured with a virtual workload management component, according to one embodiment described herein.

FIG. 4 is a flow diagram illustrating a method for deploying a virtual workload based on network switch fabric state data, according to one embodiment described herein. As shown, the method 400 begins at block 410, where the virtual workload management component 110 receives a request to deploy a virtual workload. The virtual workload management component 110 identifies a plurality of physical servers onto which the virtual workload could be deployed (block 420) and selects one of the physical servers, based at least in part on network state data for network resources related to the various physical servers (block 430). For example, the virtual workload management component 110 could use the relationship information determined using the method 300 shown in FIG. 3 to identify network resources within the switch fabric capable of affecting each of the physical servers. The virtual workload management component 110 could then use such information to interpret network state data 145 queried from the network controller 140. As an example, if the network state data 145 indicates that links between a particular ToR switch and one or more spine network switches are experiencing problems, the virtual workload management component 110 could identify any physical servers connected to the particular ToR switch and could determine that these physical servers are less suitable for deploying the virtual workload.

Of course, in practice, the virtual workload management component 110 may consider a number of different parameters in selecting the physical server(s) on which to deploy the virtual workload. While these parameters generally include network state and health data relating to network devices within the switch fabric as discussed above, such parameters may also include resource usage and availability heuristics for the computing resources of the physical machines. More generally, any parameters indicative of the suitability of a physical machine to host a virtual workload can be used, consistent with the present disclosure. Generally, a number of different techniques may be used to evaluate the parameters for selecting the physical server(s) on which to deploy the virtual workload. Examples of such techniques include a weighted average, the use of predefined threshold values for various parameters that, when exceeded by the network health data for a particular physical server, reduces the corresponding server's suitability for the workload deployment, and so on.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method of virtual workload deployment based on computing resource hardware usage and associated network hardware state, the computer-implemented method comprising:
    for each of a plurality of computing resources within one or more data centers onto which a virtual workload can be deployed, determining a computing resource hardware usage for the respective computing resource, maintaining network topology information for at least one network fabric of the one or more data centers, and determining, based on network state data for the network fabric, an associated network hardware state for a network device communicatively connected to the respective computing resource;
    in response to the determining based on network state data for the network fabric the associated network hardware state for the network device, automatically selecting one or more computing resources of the plurality of computing resources based on evaluating, for each of the plurality of computing resources and by operation of one or more computer processors, a predefined function of both (i) the computing resource hardware usage for the respective computing resource and (ii) the associated network hardware state for the network device communicatively connected to the respective computing resource; and
    deploying the virtual workload onto the automatically selected one or more computing resources, whereafter an indication that the virtual workload is deployed is outputted.

2. The computer-implemented method of claim 1, wherein the computing resources comprise a plurality of physical servers onto which the virtual workload can be deployed.

3. The computer-implemented method of claim 2, wherein deploying the virtual workload onto the selected one or more computing resources further comprises deploying the virtual workload onto one or more of the plurality of physical servers.

4. The computer-implemented method of claim 1, further comprising:
    subsequent to deploying the virtual workload onto the automatically selected one or more computing resources, redeploying the virtual workload to a different one or more computing resources of the plurality of computing resources automatically selected based on reevaluating, for each of the plurality of computing resources, a predefined function of both (i) the computing resource hardware usage for the respective computing resource and (ii) the associated network hardware state for the network device communicatively connected to the respective computing resource, whereafter an indication that the virtual workload is redeployed is outputted.

5. The computer-implemented method of claim 1, wherein the virtual workload comprises one or more virtual machine images.

6. The computer-implemented method of claim 5, wherein the virtual workload further comprises at least one of (i) a load balancing component, (ii) a firewall, (iii) a virtual host, and (iv) Multiprotocol Label Switching (MPLS) Virtual Private Network (VPN) services.

7. The computer-implemented method of claim 1, further comprising:
    receiving, via an Application Program Interface (API), a user request to deploy the virtual workload within one or more data centers.

8. A system of virtual workload deployment based on computing resource hardware usage and associated network hardware state, the system comprising:
    one or more computer processors; and
    a memory containing computer program code that, when executed by the one or more computer processors, performs an operation comprising:
        for each of a plurality of computing resources within one or more data centers onto which a virtual workload can be deployed, determining a computing resource hardware usage for the respective computing resource, maintaining network topology information for at least one network fabric of the one or more data centers, and determining, based on network state data for the network fabric, an associated network hardware state for a network device communicatively connected to the respective computing resource;

in response to the determining based on network state data for the network fabric the associated network hardware state for the network device, automatically selecting one or more computing resources of the plurality of computing resources based on evaluating, for each of the plurality of computing resources and by operation of one or more computer processors, a predefined function of both (i) the computing resource hardware usage for the respective computing resource and (ii) the associated network hardware state for the network device communicatively connected to the respective computing resource; and deploying the virtual workload onto the automatically selected one or more computing resources, whereafter an indication that the virtual workload is deployed is outputted.

9. The system of claim 8, wherein the computing resources comprise a plurality of physical servers onto which the virtual workload can be deployed.

10. The system of claim 9, wherein deploying the virtual workload onto the selected one or more computing resources further comprises deploying the virtual workload onto one or more of the plurality of physical servers.

11. The system of claim 8, the operation further comprising:

subsequent to deploying the virtual workload onto the automatically selected one or more computing resources, redeploying the virtual workload to a different one or more computing resources of the plurality of computing resources automatically selected based on reevaluating, for each of the plurality of computing resources, a predefined function of both (i) the computing resource hardware usage for the respective computing resource and (ii) the associated network hardware state for the network device communicatively connected to the respective computing resource, whereafter an indication that the virtual workload is redeployed is outputted.

12. The system of claim 8, wherein the virtual workload further comprises at least one of (i) a load balancing component, (ii) a firewall, (iii) a virtual host, and (iv) Multiprotocol Label Switching (MPLS) Virtual Private Network (VPN) services.

13. The system of claim 8, the operation further comprising:

receiving, via an Application Program Interface (API), a user request to deploy the virtual workload within one or more data centers.

14. A non-transitory computer-readable medium containing computer program code that, when executed, performs an operation for virtual workload deployment based on computing resource hardware usage and associated network hardware state, the operation comprising:

for each of a plurality of computing resources within one or more data centers onto which a virtual workload can be deployed, determining a computing resource hardware usage for the respective computing resource, maintaining network topology information for at least one network fabric of the one or more data centers, and determining, based on network state data for the network fabric, an associated network hardware state for a network device communicatively connected to the respective computing resource;

in response to the determining based on network state data for the network fabric the associated network hardware state for the network device, automatically selecting one or more computing resources of the plurality of computing resources based on evaluating, for each of the plurality of computing resources and by operation of one or more computer processors, a predefined function of both (i) the computing resource hardware usage for the respective computing resource and (ii) the associated network hardware state for the network device communicatively connected to the respective computing resource; and deploying the virtual workload onto the automatically selected one or more computing resources, whereafter an indication that the virtual workload is deployed is outputted.

15. The non-transitory computer-readable medium of claim 14, wherein the network device comprises at least one of (i) a Top of Rack (ToR) switch that is directly adjacent to the respective computing resource, in a network topology described by the network topology information or (ii) a spine network switch within the network fabric that is communicatively connected to the ToR switch, and wherein the associated network hardware state comprises at least one of (i) a measure of Media Access Control (MAC) table entries, (ii) a measure of Virtual Local Area Network (VLAN) availability, (iii) a measure of hardware network route availability, (iv) a measure of bandwidth subscriptions, (v) a measure of feature availability in one of the ToR switch and the spine network switch, (vi) a measure of server uplink subscriptions, or (vii) a measure of fabric link subscriptions.

16. The non-transitory computer-readable medium of claim 15, wherein the computing resources comprise a plurality of physical servers onto which the virtual workload can be deployed, wherein deploying the virtual workload onto the selected one or more computing resources further comprises deploying the virtual workload onto one or more of the plurality of physical servers.

17. The non-transitory computer-readable medium of claim 16, the operation further comprising:

subsequent to deploying the virtual workload onto the automatically selected one or more computing resources, redeploying the virtual workload to a different one or more computing resources of the plurality of computing resources automatically selected based on reevaluating, for each of the plurality of computing resources, a predefined function of both (i) the computing resource hardware usage for the respective computing resource and (ii) the associated network hardware state for the network device communicatively connected to the respective computing resource, whereafter an indication that the virtual workload is redeployed is outputted.

18. The non-transitory computer-readable medium of claim 17, wherein the virtual workload comprises one or more virtual machine images, wherein the virtual workload further comprises, in respective instances, (i) a load balancing component, (ii) a firewall, (iii) a virtual host, and (iv) Multiprotocol Label Switching (MPLS) Virtual Private Network (VPN) services.

19. The non-transitory computer-readable medium of claim 18, wherein the computing resource hardware usage for each computing resource comprises, in respective instances, (i) processor utilization of the respective computing resource, (ii) memory utilization of the respective computing resource, (iii) storage utilization of the respective computing resource, and (iv) network utilization of the respective computing resource, wherein the operation further comprises receiving, via an Application Program Interface (API), a user request to deploy the virtual workload within one or more multi-tenant data centers.

* * * * *

UNITED STATES PATENT AND TRADEMARK OFFICE
CERTIFICATE OF CORRECTION

PATENT NO. : 10,754,698 B2
APPLICATION NO. : 16/132030
DATED : August 25, 2020
INVENTOR(S) : Padmanabhan Krishnan et al.

Page 1 of 1

It is certified that error appears in the above-identified patent and that said Letters Patent is hereby corrected as shown below:

In the Drawings

On Sheet 1 of 5, reference numeral 165, in Figure 1, Line 1, delete "VERTUAL" and insert -- VIRTUAL --, therefor.

On Sheet 1 of 5, reference numeral 170, in Figure 1, Line 1, delete "VERTUAL" and insert -- VIRTUAL --, therefor.

In the Specification

In Column 7, Line 42, delete "$NH = w_1 * m_1 \; w_2 * m_2 \ldots + w_N * m_N$ Equation 1—Overall Network Health" and insert $$NH = w_1 * m_1 + w_2 * m_2 \ldots + w_N * m_N$$

-- Equation 1 – Overall Network Health --, therefor.

Signed and Sealed this
Sixth Day of October, 2020

Andrei Iancu
*Director of the United States Patent and Trademark Office*